United States Patent
Walk

[11] 3,803,955
[45] Apr. 16, 1974

[54] SINGLE-SPINDLE ROTARY MACHINE TOOL

[75] Inventor: Georg Walk, Rheydt, Germany

[73] Assignee: A. Monforts, Monchengladbach, Germany

[22] Filed: Jan. 22, 1973

[21] Appl. No.: 325,938

[30] Foreign Application Priority Data
Jan. 20, 1972 Germany.............................. 2202592

[52] U.S. Cl. ................................................ 82/2.5
[51] Int. Cl. ............................................ B23b 13/02
[58] Field of Search ............. 82/2.5, 2.7; 29/41, 568

[56] References Cited
UNITED STATES PATENTS

| | | | |
|---|---|---|---|
| 3,587,368 | 6/1971 | Reiners et al. | 82/2.5 |
| 3,587,369 | 7/1971 | Reiners et al. | 82/2.5 |
| 3,550,487 | 12/1970 | Randall et al. | 82/2.5 |
| 3,354,760 | 11/1967 | Barragan | 29/568 X |
| 3,267,550 | 8/1966 | Whittum et al. | 29/568 |

Primary Examiner—Harrison L. Hinson
Attorney, Agent, or Firm—Herbert L. Lerner

[57] ABSTRACT

Single spindle rotary machine tool includes a spindle stock a workpiece spindle drivingly mounted in the spindle stock, and having a fixed axis, the workpiece spindle having a head, a workpiece chuck seated on said spindle head, the workpiece chuck, in operating position thereof on the spindle head, having an axis rectilinearly aligned with the fixed axis of the workpiece spindle, a tool turret shaft mounted in the spindle stock below and parallel to the workpiece spindle, a rotary disc spaced from the workpiece spindle on the spindle stock and revolvable about an axis extending parallel to the axis of the workpiece spindle at least two workpiece chucks releasably installable at given locations of the rotary disc,and sliding carriage means for transporting the workpiece chucks respectively between the rotary disc and the workpiece spindle, the rotary disc and the sliding carriage means being cooperatively associated with one another for automatically exchanging one of the workpiece chucks with another of the workpiece chucks at the operating position thereof on the spindle head.

8 Claims, 6 Drawing Figures

SINGLE-SPINDLE ROTARY MACHINE TOOL

The invention relates to a single-spindle rotary machine tool and, more particularly, to such a machine tool having a horizontal workpiece spindle drivingly mounted in a spindle stock, the workpiece spindle having a stationary axis which is aligned with a workpiece chuck that is seated, in operating position thereof, on the head of the spindle, the machine tool also having a tool turret carried by a shaft that is mounted in the spindle stock below the workpiece spindle and extending parallel thereto. Machine tools of this general type are exemplified by the single-spindle turret lathes or similar machine tools described, for example, in German Patents 865,090, 906,165 and 911,569, and in U.S. Pat. No. 3,587,368. Because the tool turret of such machines is held in position not only by the turret shaft but also by additional index pins or bolts, and also because the workpiece spindle is mounted stably in the spindle stock, exceptionally accurate and exact turning operations can be effected with such machines.

More recently, attempts have been made, in addition, to facilitate the clamping of machinable workpieces in the aforementioned and similar rotary machine tools, as well as the removal of workpieces therefrom. Accordingly, there has already been proposed heretofore, in the case of a single-spindle rotary machine tool, to provide on the spindle stock an adjustable or shiftable support for receiving thereon on at least two workpiece chucks which by actuation of the support, are displaceable individually into operating position thereof opposite the spindle and are there connectible with the workpiece spindle (note U.S. Pat. No. 3,587,369). The adjustable support of this heretofore known construction is in the form of a sliding carriage having mounting openings for workpiece chucks formed therein, the workpiece chucks being disposable at the head of the workpiece spindle through the respective mounting openings. Means for transferring from the sliding carriage to the spindle head a workpiece chuck wherein a workpiece is clamped is provided on the spindle head of this heretofore known construction. The use of such a sliding carriage, in fact, permits the workpiece to be inserted into the respective chuck at a location away from the machining area per se or to remove the workpiece thereat after it has been machined, however, as a rule, the clamping and removal of a workpiece while another workpiece is being machined cannot be effected with this heretofore known construction.

In the aforementioned U.S. Pat. No. 3,587,369, means are proposed which permit the insertion of a workpiece into a machine tool chuck and the removal thereof from the chuck during the period when another workpiece is being machined. In this case, the carrier for transporting the workpiece chucks, in which a workpiece may be clamped, between the clamping and removing station and the operating station (at the workpiece spindle) is a rotary member, for example a planar rotary disc or a rotary member shaped like a frustrum of a cone, which is revolvable about a shaft mounted in a spindle stock. If it is desired to retain a tool turret shaft below the workpiece spindle in this known machine tool which is provided with a rotary member, it is advantageous so to dispose in the spindle stock the shaft about which the rotary member revolves that it is askew to the turret shaft and the workpiece spindle, whereby the clamping or removing station on the rotary member is not located at too great a height i.e. is poorly accessible. If a planar rotary disc is to be used which is revolvable about a shaft that is parallel to the spindle axis and which has a clamping and removing station that is located at about the same height as that of the spindle head, as has already been proposed heretofore, the turret shaft can then be located not beneath but laterally of the workpiece spindle in such a way that the turret shaft is disposed outside the radius of the rotary disc.

With the last-mentioned construction of laterally opposing spindle and turret shaft axes, in some types of machines, however in contrast to the case where the turret shaft is located beneath the workpiece spindle, the number of mountable tools is reduced.

It is an object of the invention to provide a single spindle rotary machine tool wherein the turret shaft disposed beneath and parallel to the workpiece spindle and wherein exchange of the workpieces is effected on a rotary disc having a shaft that is mounted in the spindle stock parallel to the workpiece spindle and the tool turret shaft, that permits clamping and removal of workpieces during the time when another workpiece is being actually machined.

With the foregoing and other objects in view, there is provided in accordance with the invention, a single spindle rotary machine tool comprising a spindle stock, a workpiece spindle drivingly mounted in the spindle stock and having a fixed axis the workpiece spindle having a head, a workpiece chuck seated on the spindle head, the workpiece chuck, in operating position thereof on the spindle head, having an axis rectilinearly aligned with the fixed axis of the workpiece spindle, a tool turret shaft mounted in the spindle stock below and parallel to the workpiece spindle a rotary disc spaced from the workpiece spindle on the spindle stock and revolvable about an axis extending parallel to the axis of the workpiece spindle, at least two workpiece chucks releasably installable at given locations of the rotary disc, and sliding carriage means for transporting the workpiece chucks respectively between the rotary disc and the workpiece spindle, the rotary disc and the sliding carriage means being cooperatively associated with one another for automatically exchanging one of the workpiece chucks with another of the workpiece chucks at the operating position thereof on the spindle head.

In accordance with the invention, sliding carriage means are provided which can only receive one workpiece chuck in which a workpiece may be clamped and can reciprocably transport it between the spindle head and the rotary disc. In the construction according to the invention, the advantages of the rotary disc are combined with those of the sliding carriage for the case that with a readily accessible disposition of the rotary disc on the spindle stock, the disposition of the workpiece spindle and the tool turret shaft, which is especially advantageous for the tools, is maintained. Accordingly, the clamping and unclamping of workpieces in the machine tool can take place while another workpiece is being machined thereby. If, for example, a workpiece seated on the workpiece spindle has been completely machined, it is transported together with its chuck by means of the sliding carriage to the rotary disc and, after the rotary disc has been revolved, a new workpiece together with its chuck is conveyed to the workpiece spindle head by the sliding carriage and is thereat released from the sliding carriage by actuating a clutch or coupling, which is advantageously provided on the spindle, and is suitably secured or coupled to the spindle head.

In accordance with the invention, a single sliding carriage can be used which is capable of traveling reciprocatingly between the rotary disc and the workpiece spindle. In accordance with a further and particularly desirable feature of the invention, instead of a single sliding carriage, there is provided a sliding carriage for each of the given locations of the rotary disc, the sliding carriages remaining in the rotary disc as the latter is revolved, so that the exchange of workpieces or chucks is able to be effected in a clamping and removing station located outside of the operating position though directly in the sliding carriage. This feature is advantageous because, generally, it renders superfluous any coupling and uncoupling of the chucks and sliding carriages in the rotary disc and moreover, some reciprocal movement of the sliding carriage between the rotary disc and the workpiece spindle. Thereby not only is the mechanism of the machine tool simplified, but also the time required for exchanging the workpieces i.e., the inoperative period of the machine, is further reduced.

In accordance with yet other features of the invention, the sliding carriage is provided with its own drive mechanism or can be constructed as a slider or pusher.

In accordance with additional features of the invention, the sliding carriage for the respective workpiece chuck in which actually the workpiece which has already been machined is clamped, remains either in the rotary disc or in an intermediate station while the machining occurs in front of the spindle head. Both of these last-mentioned alternate features are especially advantageous when a workpiece chuck is provided which is revolvable with respect to the spindle axis.

In accordance with a concomitant feature of the invention, in the novel machine tool, means for coupling or uncoupling the chucks and the spindle head as well as means for releasing the chucks and the sliding carriages from one another or securing them to one another are provided on the spindle head or in or on the spindle. Thus, the sliding carriages need not be additionally burdened with such coupling means.

Although the invention is illustrated and described herein as embodied in single-spindle rotary machine tool it is nevertheless not intended to be limited to the details shown since various modifications and structural changes may be made therein without departing from the spirit of the invention and within the scope and range of equivalents of the claim.

The construction and method of operation of the invention, however, together with additional objects and advantages thereof will be best understood from the following description of specific embodiments when read in connection with the accompanying drawings in which.

Figure 1:
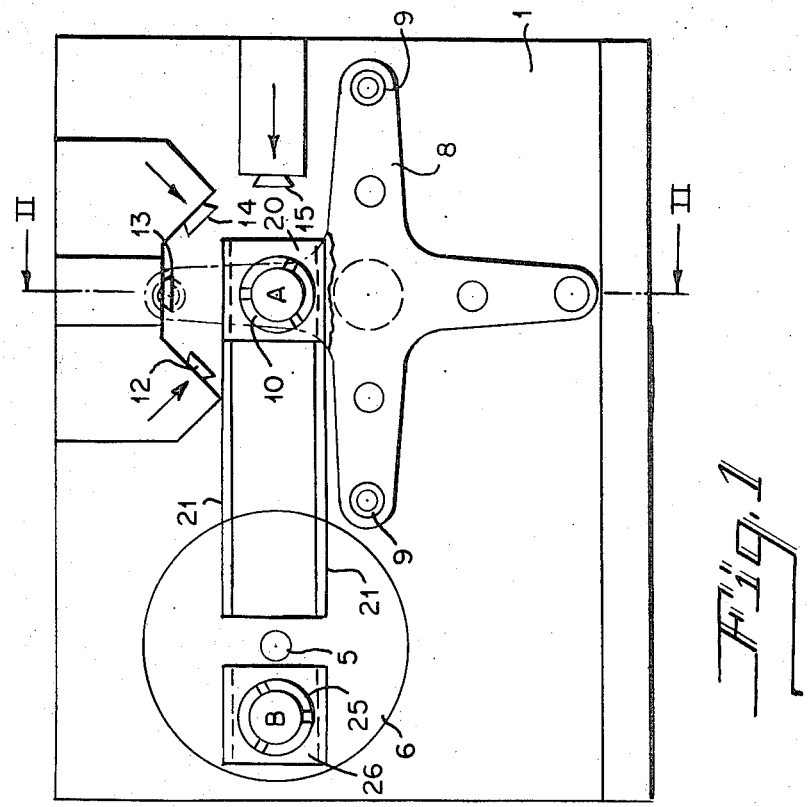
FIG. 1 is a diagrammatic front elevational view of a single-spindle rotary machine tool constructed in accordance with the invention.

In the drawing, the principals of a single-spindle rotary machine tool are illustrated wherein a sliding carriage is associated with each location of the rotary disc at which a workpiece chuck is provided.

Figure 2:
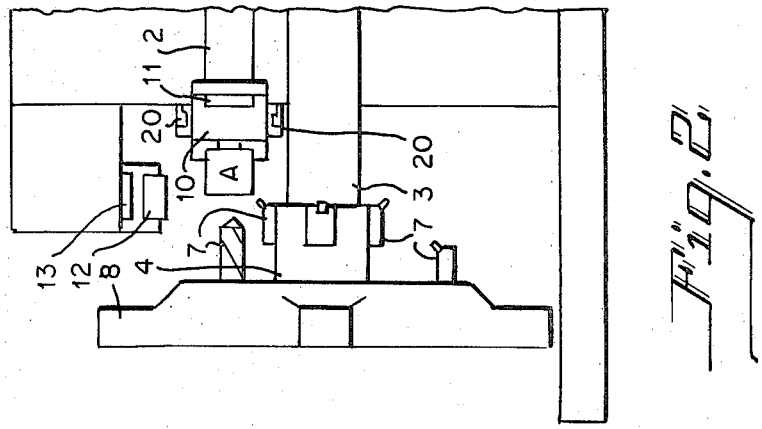
FIG. 2 is a partial longitudinal sectional view of FIG. 1 taken along the line II — II in direction of the arrows.
Figure 3:
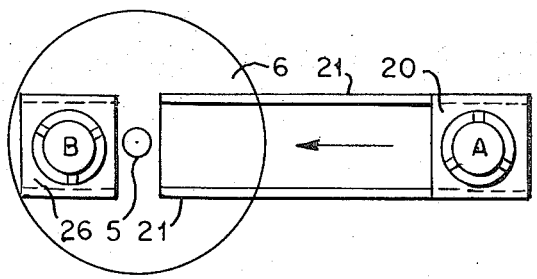
FIGS. 3 to 6 are fragmentary views of FIG. 1 showing the sliding carriage and rotary disc in variOus different phases thereof.

Referring now to the drawing and first particularly to FIGS. 1 and 2 thereof, there is shown therein a machine tool block 1 wherein a workpiece spindle 2, the drive mechanism for which is omitted in the interest of clarity, and a shaft 3 for a tool turret 4, the spindle 2 and the shaft 3 being disposed one above the other. A revolving shaft 5 for a rotary disc is disposed in the block 1 substantially at the same height as that of the workpiece spindle 2. The turret 4 is four-sided in the illustrated embodiment and carries machining tools 7. This turret 4 is additionally provided with arms 8 which serve, among other things, to secure the turret 4 against undesired turning by means of index pins or bolts 9 that are inserted into matching recesses provided in the machine block 1. In FIG. 1, the arm 8 of the turret 4 that is located in front of the workpiece A or the spindle 2 is shown in phantom in the interest of clarity. Tools, such as those located at 12 to 15, are mounted on the machine block 1 per se (around the workpiece A which secured with the chuck 10 on the spindle head 11) in addition to the tools 7 that are mounted on the turret 4 or the arms 8 thereof. It is readily apparent from FIGS. 1 and 2 that the operating space around the workpiece A for the servicing or operating personnel is accessible only with considerable difficulty so that an exchange of workpieces in the chuck 10 which is seated on the spindle 2 or the spindle head 11 is laborious and time-consuming.

Consequently, in accordance with the invention, the workpiece A together with the respective clutch 10, after the latter has been uncoupled or disconnected from the spindle head 11, and after it has been coupled or connected to the sliding carriage 20, can be driven laterally on the sliding carriage 20 out of the operating space. The sliding carriage 20 travels in a suitable guide 21 which is extended into the rotary disc 6.

Figure 4:
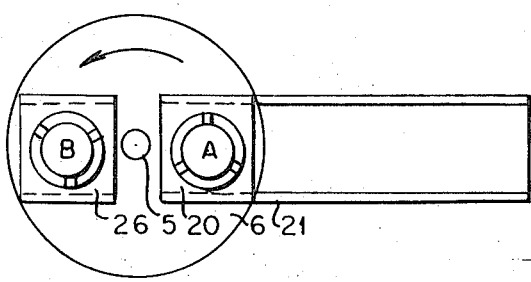
Figure 5:
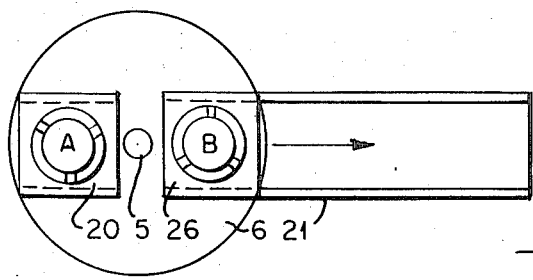

When the sliding carriage 20 with the workpiece A and its respective chuck 10 has been driven completely into the rotary disc 6, the latter is revolved about its shaft 5 in direction of the arrow, as shown in FIG. 4, and the workpiece B together with its chuck 25 (FIG. 1) which is mounted in a sliding carriage 26, is revolved into the location that had been previously occupied by the workpiece A after it had been driven into the rotary disc 6. From this new location of the workpiece B, as shown in FIG. 5, it can be driven together with the sliding carriage 26 and its chuck 25 directly along the guide 21 into the operating space or location in front of the spindle head 11, such as into the location shown in FIG. 6. The chuck 25 can then be released from the sliding carriage 26 and can be connected at the same time to the spindle head 11. Machining of the workpiece B can then be directly started. Depending upon the individual case, the sliding carriage 26 can either remain in front of the spindle head 11 during the machining of the workpiece B or driven back into the rotary disc 6 or halted at an intermediate location or station. While the workpiece B is then being machined, the workpiece A which had been previously machined is replaced by a further workpiece which has yet to be machined. This replacement of the machine workpiece A is effected far outside the operating space or station at a location which is not only conveniently accessible but also simultaneously permits the operating personnel to observe or monitor the operating space.

Figure 6:
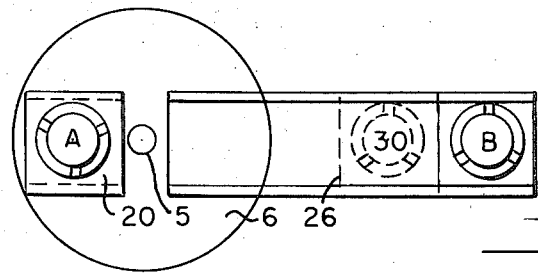

In FIGS. 3 to 6, the aforedescribed four phases of the workpiece exchange i.e., the exchange of the workpieces A and B at the machining location, are illustrated. In FIG. 6, moreover, an intermediate station 30 for the sliding carriage 26 of the workpiece B is shown, at which the sliding carriage 26 may be located while the workpiece B is being machined. The sliding carriage 26 would otherwise hamper the machining operation if it remained within the operating space or station.

In contrast to the illustrated embodiment wherein a separate sliding carriage is provided for each location of the rotary disc 6 at which a workpiece chuck is to be disposed, if only a single sliding carriage is available common to all of the chucks and which is drivable only between the machining station at the spindle 2 and the rotary disc 6, this single sliding carriage is always driven out of the rotary disc 6 before the latter is revolved. Moreover, suitable means are provided to permit the transfer of the workpiece chucks between the sliding carriage and the rotary disc. Such an embodiment of the invention, though not quite as convenient as that of the illustrated embodiment, nevertheless affords virtually the same advantages that are derived from the illustrated embodiment of the invention.

I claim:

1. Single spindle rotary machine tool comprising a spindle stock, a workpiece spindle drivingly mounted in said spindle stock and having a fixed axis, said workpiece spindle having a head, a workpiece chuck seated on said spindle head, said workpiece chuck, in operating position thereof on said spindle head, having an axis rectilinearly aligned with the fixed axis of said workpiece spindle, a tool turret shaft mounted in said spindle stock below and parallel to said workpiece spindle, a rotary disc spaced from said workpiece spindle on said spindle stock and revolvable about an axis extending parallel to the axis of said workpiece spindle, at least two workpiece chucks releasably installable at given locations of said rotary disc, and sliding carriage means for transporting the workpiece chucks respectively between said rotary disc and said workpiece spindle, said rotary disc and said sliding carriage means being cooperatively associated with one another for automatically exchanging one of said workpiece chucks with another of said workpiece chucks at said operating position thereof on said spindle head.

2. Single - spindle rotary machine tool according to claim 1 wherein said sliding carriage means comprises a sliding carriage associated with each of said given locations of said rotary disc for said workpiece chucks, said rotary discs being revolvable with said sliding carriages remaining thereon so that an exchange of workpieces is able to be effected at a workpiece clamping and removing station distant from said operating position of said workpiece chuck yet directly in the respective sliding carriage.

3. Single - spindle rotary machine tool according to claim 1 wherein said sliding carriage means has its own drive mechanism.

4. Single - spindle rotary machine tool according to claim 1 wherein said sliding carriage means is constructed as a pusher.

5. Single - spindle rotary machine tool according to claim 2 wherein said sliding carriage associated with the workpiece chuck retaining the workpiece actually being machined is located in said rotary disc during the machining of said workpiece in front of said spindle head.

6. Single - spindle rotary machine tool according to claim 2 wherein said sliding carriage associated with the workpiece chuck retaining the workpiece actually being machined is located at a station intermediate said last-mentioned workpiece chuck and said rotary disc.

7. Single - spindle rotary machine tool according to claim 1 including means for coupling and uncoupling said workpiece chucks and said spindle head as well as for releasing said chucks and said sliding carriages from one another and securing them to one another, said last-mentioned means being located on said spindle head.

8. Single - spindle rotary machine tool according to claim 1 including means for coupling and uncoupling said workpiece chucks and said spindle head as well as for releasing said chucks and said sliding carriages from one another and securing them to one another, said last-mentioned means being located means being carried by said spindle.

* * * * *